Nov. 12, 1968 F. W. LESCINSKY 3,411,090

SIGNAL PHASE CONTROL CIRCUITS

Filed Dec. 17, 1965 2 Sheets-Sheet 1

INVENTOR
F. W. LESCINSKY
BY
Charles Scott Phelan
ATTORNEY

Nov. 12, 1968 F. W. LESCINSKY 3,411,090

SIGNAL PHASE CONTROL CIRCUITS

Filed Dec. 17, 1965 2 Sheets-Sheet 2

3,411,090
SIGNAL PHASE CONTROL CIRCUITS
Frank W. Lescinsky, Middletown Township, Monmouth County, N.J., assignor to Bell Telephone Laboratories, Incorporated, New York, N.Y., a corporation of New York
Filed Dec. 17, 1965, Ser. No. 514,583
10 Claims. (Cl. 325—323)

Figure 1:
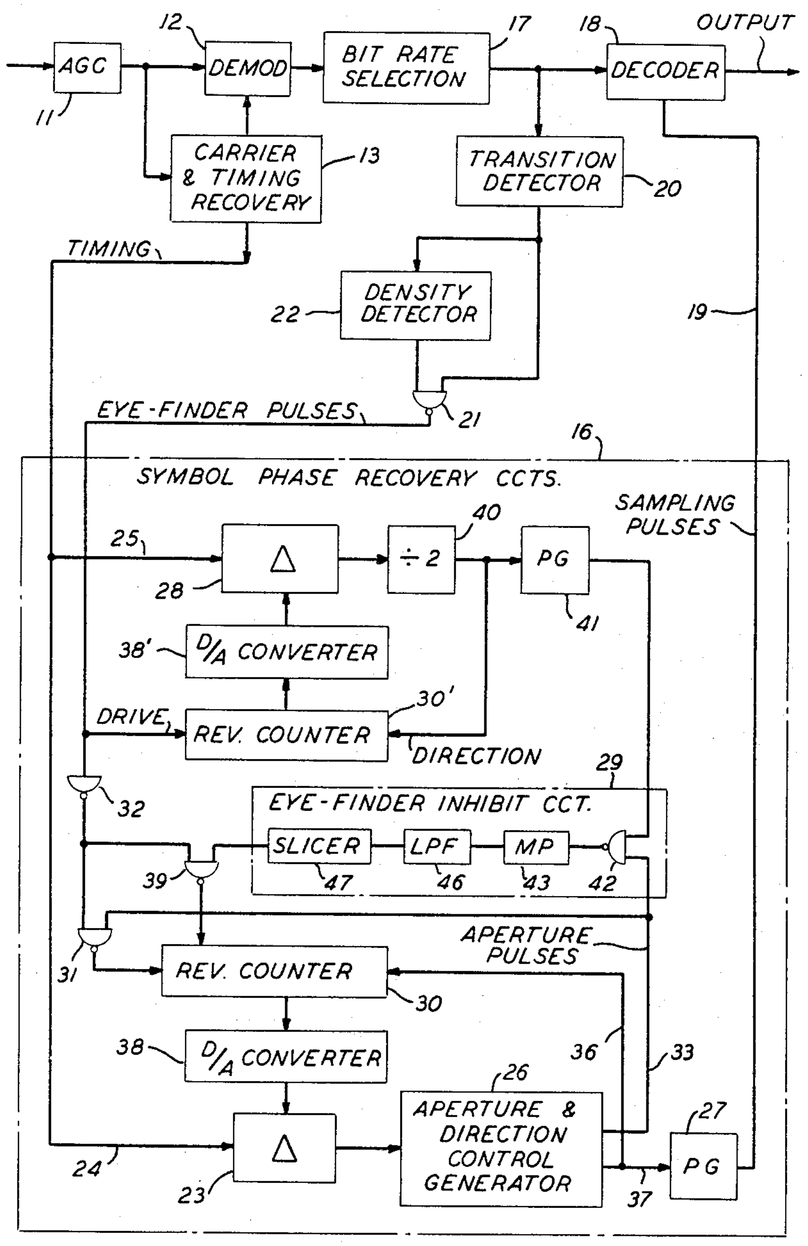

This invention relates to automatic phase control circuits. More particularly, the invention relates to circuits for securing a predetermined phase relationship between two electrical signal waves having different characteristics.

In certain transmission systems it is necessary to utilize a locally produced oscillation wave to control the sampling of another electrical signal wave. The latter signal wave may, for example, be a data information wave or other similar type of wave including successive information-determining signal levels. In such arrangements it is necessary to achieve an initial phase full-in between the oscillation and signal waves and thereafter to maintain a predetermined phase relationship between them in spite of dynamic disturbances which can alter the initial phase conditions.

It is usually advantageous to accomplish phase control between two electric signal waves by automatic arrangements so that it is not necessary for an attendant to maintain constant surveillance of the phase relationships. One such automatic phase control system is disclosed and claimed in the copending application of F. K. Becker and F. W. Lescinsky, Ser. No. 459,589, filed May 28, 1965. The present invention is an improvement upon that Becker et al. application and is particularly useful in fixed transmission circuits that have established equalization so that automatic adaptive equalization is not required. The invention is nevertheless useful in connection with circuits which utilize such automatic equalization.

In the aforementioned Becker-Lescinsky application circuits are shown for automatically controlling the phase of timing signals with respect to a multilevel coded data signal by utilizing certain signal amplitude characteristics that are relatively stable even though the signal may be subject to substantial distortion prior to reception. The phase control technique is based upon the data signal eye pattern characteristics, which pattern is produced when oscilloscope traces of successive segments of a multilevel data signal are superimposed upon one another in a fashion that is known in the art. However, the actual production of such an eye pattern is not required for the present invention or for the invention in the Becker-Lescinsky application. In that application the data signal transitions between adjacent information-determinant signal levels are detected and utilized to produce a pulse train which is integrated by a reversible binary counter for developing an analog signal to control the phase of a train of timing pulses.

The manner in which the counter direction of operation and drive are controlled in the Becker-Lescinsky system causes the timing pulse phase to be adjusted initially with respect to an amplitude peak in the envelope of the long time probability distribution of data signal transitions. Thereafter the timing pulse phase is adjusted with respect to a predetermined aperture time slot wherein the input multilevel signal has significant information-representing levels. The transition of phase adjustment between the initial and subsequent control modes is achieved in cooperation with an automatic equalization circuit which adapts its operation to transmission characteristics of the circuit over which the multilevel signals are being received. These two modes of control operation produce rapid pull-in to the desired phase condition.

In the Becker-Lescinsky application and in the present application, the aforementioned transition pulses are designated eye-finder pulses because they are used to achieve coarse pull-in of timing signal phase to the phase of the eye of the data wave. Aperture pulses are generated to be somewhat longer than the eye time slot and are used in conjunction with eye-finder pulses to maintain fine phase lock on the eye in spite of signal distortion that might shift the position of the aforementioned distribution envelope characteristic.

It is one object of the present invention to improve electric signal phase control systems.

It is another object to improve automatic arrangements for controlling the phase relationship between two electric signal waveforms.

Another object of the invention is to achieve rapid phase pull-in for timing signals without the requirement of an automatic equalizer.

A further object is to control the phase relationship between two electric signal waves so that the exercise of the phase control is relatively independent of signal distortion.

These and other objects of the invention are realized in an illustrative embodiment thereof by adjusting the phase of a timing wave in two separate branch circuits to a predetermined relationship with respect to a known characteristic of an input data signal wave. After a coarse phase adjustment has been accomplished, circuits which are responsive to the reduction in the magnitude in phase error angle reduce the rate of error angle correction in the one of the two branch circuits which provides the desired phase adjusted timing signals.

It is one feature of the invention that each control branch circuit includes a phase adjusting circuit that is operated by a reversible counter which in turn is driven by data signal transition pulses derived from the input data signal and which counter is periodically reversed in response to a function of the timing wave.

It is another feature that only one of the two branch circuits provides controlled timing pulses for utilization, and the counter thereof is driven at a first rate by eye-finder pulses which are in coincidence with aperture pulses, and the same counter is also driven initially at a greater rate by the eye-finder pulses alone.

In accordance with a further feature the counter drive in response to eye-finder pulses alone is inhibited after coarse phase pull-in has been achieved.

Yet another feature is that the status of the phase relationship between the data and timing waves is detected as a function of the outputs of the two phase adjusting branches, one with only phase adjusted timing pulses and the other with phase adjusted aperture pulses.

A more complete understanding of the present invention and the various features and objects thereof may be obtained from consideration of the following detailed description when considered in connection with the appended claims and the attached drawing in which:

FIG. 1 is a simplified block and line diagram of a phase control system in accordance with the invention; and FIGS. 2 through 8 are wave diagrams illustrating the operation of the invention.

The phase recovery circuits of the invention are illustrated in FIG. 1 in only block and line diagram form because the various blocks of the circuits are either well known in the art or are shown in detail in the aforementioned Becker-Lescinsky application. In either case, the details of such blocks comprise no part of the present invention.

Figure 2:
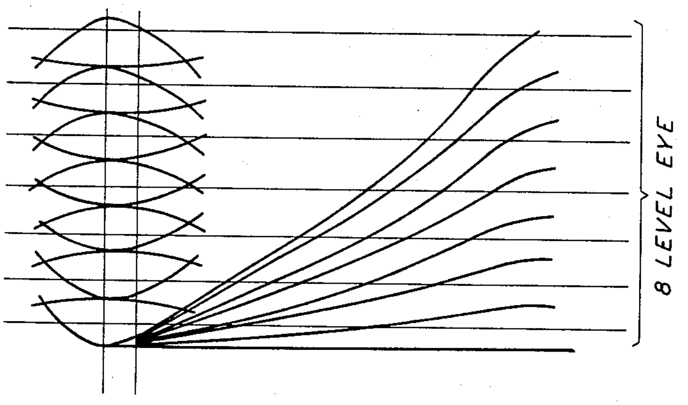

The wave diagrams of FIGS. 2 through 8 correspond to the similar diagram in FIGS. 17 through 23 of the mentioned Becker-Lescinsky application. FIG. 2 includes superimposed data symbol traces in a multilevel coded data wave and illustrates specifically the relevant portions of an eye pattern for a distorted eight-level data signal. However, the invention is not restricted to operation with signal waves of that number of levels. The seven eyes in the pattern for such a signal are shown in the left-hand portion of FIG. 2, and in the central and right-hand portions of the figure are shown the eight possible alternative signal excursions that may be realized in a transition from a single one of the traces at the left-hand portion of the diagram to a succeeding eye time slot at the right-hand edge of the figure. Each of the other superimposed traces of the eye pattern in FIG. 2 may similarly move to its same level or any one of the seven other information-determinant amplitude levels between successive information-determinant time slots of the data signal, which time slots are represented by the data eye. Superimposed upon the wave diagram of FIG. 2 are seven horizontal lines defining the eight information-determinant levels and representing information-defining reference levels.

Figure 3:
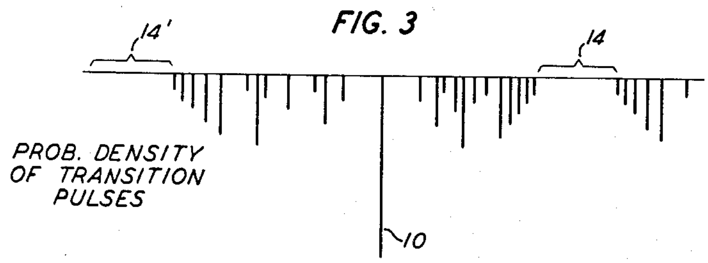

Each time that a data signal excursion in FIG. 2 crosses one of the seven reference levels a transition pulse is generated, as will be hereinafter outlined; and a long time probability distribution for such transition pulses over a time interval including somewhat more than a complete data signal symbol interval is shown in FIG. 3. The distribution between successive eyes, as indicated in FIG. 3, has an envelope having a characteristic salient peak approximately midway between successive eyes. This peak occurs at the spectral line 10, and it is not exactly midway between the two eyes because distortion in the data signal wave has shifted the time of most frequent intersection of the wave with the reference levels to the right in the drawing.

A portion of an additional distribution pattern over a similar data symbol time interval is indicated in the right-hand portion of FIG. 3 for convenience in considering the remaining wave diagrams, and this additional portion of the distribution diagram in FIG. 3 is separated from the characteristic distribution for the complete interval by an interval 14 of no spectral lines. The latter interval corresponds to the data signal eye at the right-hand edge of FIG. 2 wherein the data signal wave has some information-representative level and is not crossing any of the aforementioned seven reference levels. A similar interval 14′ corresponds to the eye at the left-hand side of FIG. 2. This characteristic absence of signal transitions at each eye is utilized as a reference for adjusting the phase of a timing signal wave with respect to the data signal wave.

Returning now to FIG. 1, multilevel coded data signals are received from a transmission line, not shown, by an automatic gain control circuit 11. Such signals are modulated on a carrier wave as is known in the art. Equalization for the transmission line is assumed to be provided on the line as is known in the art and is not shown in the drawing. The automatic gain control circuit 11 stabilizes the amplitudes of received signals to compensate to a certain extent for amplitude variations that may occur in the transmission line. The output of gain control circuit 11 is supplied both to a demodulator 12 and to a carrier and timing recovery circuit 13. The demodulator can be any type known in the art, and the demodulator which is advantageously employed is that shown in the copending F. K. Becker and L. N. Holzman application Ser. No. 459,555, filed May 28, 1965. The recovery circuit 13 is advantageously that shown in the copending F. K. Becker application Ser. No. 459,659, filed May 28, 1965.

One output from the recovery circuit 13 is coupled to the demodulator 12 and includes a carrier frequency signal with any appropriate carrier offset which may have been injected in the transmission line. A second output from the recovery circuit 13 comprises a timing wave having a frequency which is related to the symbol frequency of the multilevel data signal but which is not necessarily in phase synchronization with the data signal. This latter timing signal is applied to symbol phase recovery circuits 16 which are adapted to accordance with the present invention to achieve phase synchronization of the timing signal with the data signal wave.

The demodulator 12 removes the multilivel coded data signal from its carrier and couples the coded data symbols to a bit rate selection circuit 17 such as is shown in the aforementioned Becker-Lescinsky application. The selection circuit 17 is here considered to include rectifier-slicer circuits which initiate the decoding of the demodulator output for the particular number of coding levels employed in the multilevel data signal. Selection circuit 17 also includes circuits for selecting time constants throughout the receiving circuit of FIG. 1 which correspond to the bit rate of binary coded data prior to its coding in the multilevel form.

The output of bit rate selection circuit 17 is coupled to a decoder 18 which produces the ultimate binary coded output signal under the control of sampling pulses provided on a circuit 19 from the phase recovery circuits 16. The output of bit rate selection circuit 17 is also applied to a transition detector circuit 20 which is responsive to such output for producing a transition pulse each time the multilevel data signal crosses one of the information-determinant reference signal levels herebefore mentioned in connection with FIG. 2. These transition pulses correspond to the previously mentioned eye-finder pulses and are applied to one input of a coincidence gate 21. The second input to the gate 21 is also supplied from the transition detector 20 but by way of a transition density detector 22. The latter detector enables the gate 21 only when data signal transitions are ocurring at a sufficient rate, i.e., with sufficient density, to provide reliable information about the phase of the multilevel data signal wave. Details of such a detector are included in the Becker-Lescinsky application, but the threshold density level about which the detector operates must be determined empirically for any particular system because it depends upon such factors as the extent of equalization, the character of the transmission line, and the error rate that can be tolerated. Eye-finder pulses in the output of gate 21 are coupled to the symbol phase recovery circuits 16.

Symbol phase recovery circuits 16 include two branch circuits 24 and 25 in which phase adjustments of timing pulses are accomplished. A first one of these branch circuits is the main phase control branch 24 which includes a phase adjusting variable delay circuit 23, an aperture and direction control generator 26, and a pulse generator 27 for supplying to the circuit 19 phase adjusted sampling pulses to be used by the decoder 18. An auxiliary branch circuit 25 including a phase adjusting variable delay circuit 28 also receives the timing signals from the recovery circuit 13, and its function will be subsequently described. The pulse generator 27 advantageously includes a Schmitt trigger type of circuit which receives input pulses from the generator 26 and produces corresponding output pulses of known duration on the circuit 19. The variable delay circuit 23 is of the same type shown in the aforementioned Becker-Lescinsky application and comprises at least one trigger circuit with a voltage controllable triggering threshold. A plurality of such stages in tandem are advantageously employed. The variable delay circuit 28 is of the same type. However, because of the nature of the phase recovery circuit of the present invention, the total number of stages in the delay circuits 23 and 28 need be no more than the number of delay stages employed in phase recovery circuits of the type shown by the Becker-Lescinsky application. The reason for this will become apparent as the present phase recovery circuits are further described.

Figure 6:
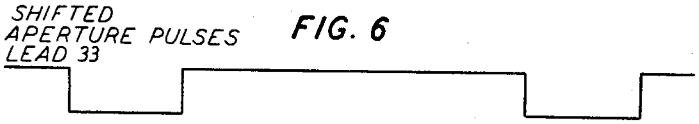
Figure 7:
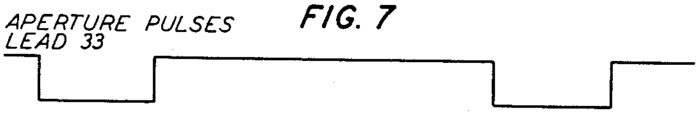

Aperture and direction control generator 26 responds to the phase adjusted timing wave for producing three output signals in much the same manner that the corresponding signals are produced by similar circuitry in the Becker-Lescinsky application. One of these output signals, on a circuit 33, is a train of recurring aperture pulses in which the pulses recur at the symbol rate of the multilevel data signal. Aperture pulses are shown in FIGS. 6 and 7; and each such aperture pulse has a time width which is somewhat wider than the data eye, e.g., the information-representative interval 14 of the data wave wherein there are no reference level transitions. However, aperture pulse width is substantially less than the full data symbol period.

The phase relationship between the aperture pulses and the data signal wave is necessarily a direct function of the phase relationship of the timing wave in the output of the variable delay circuit 23 to the same data signal wave. The aperture pulses are utilized in an eye-finder inhibit circuit 29 in a fashion which will be subsequently described. The same pulses are also utilized to control the application of eye-finder pulses to a driving input connection of a reversible binary counter 30. This control is exercised through a coincidence gate 31 which also reeives the eye-finder pulses from gate 21, after inversion in a further gate 32. The aperture pulses appearing in the output of the generator 26 are illustrated for two different phase conditions in FIGS. 6 and 7, respectively.

Figure 4:
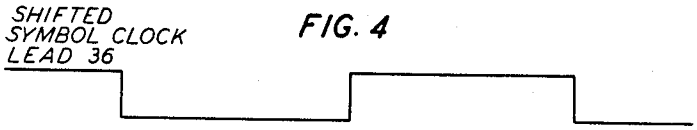
Figure 5:
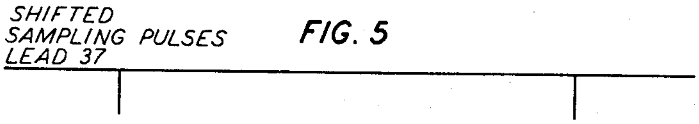

A second output from the generator 26 appears on a lead 36 which is coupled to the reversible counter 30 for controlling the direction of operation thereof. This second output is illustrated in FIG. 4 and is designated the symbol clock signal. It comprises a cyclic clock wave with a period equal to the symbol rate of the received data wave and having symmetrial positive-going and negative-going portions. Each signal transition in the symbol clock wave on circuit 36 reverses the direction of operation of counter 30 so that this counter is reversed at twice the symbol rate of the data wave. One of these two reversals occurs approximately midway in an aperture pulse, as can be seen by comparing FIGS. 4 and 6, and the other reversal occurs approximately midway between aperture pulses as can be seen from the same comparison. Direction control generator 26 need not include gating circuits for reversing the phase of the symbol clock signal in the manner provided in the Becker-Lescinsky application. The reason for this is that in that application the phase adjustment was accomplished first with respect to training pulses occurring approximately in the time slot of the spectral line 10 during a start-up period and subsequently with respect to the aperture pulses and the data eye during normal operation. However, in accordance with the present invention, both initial coarse phase pull-in and subsequent fine phase adjustments are accomplished with respect to the aperture pulses and the data eye so that it is not necessary to change the phase of reversals of counter 30 between such two modes of operation.

Figure 8:
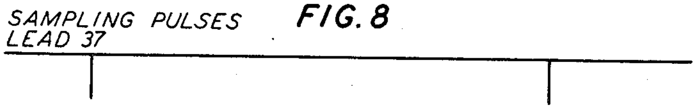

The second output from the generator 26 is also coupled by a circuit 37 for application to the pulse generator 27. The pulses in the output of generator 27 are the sampling pulses which are illustrated in FIG. 8 and which are applied by circuit 19 to decoder 18.

Counter 30 is driven at either of two rates of operation, as will be subsequently described, to control delay circuit 23. Output signals representing instantaneous count level conditions are applied to a digital-to-analog converter 38 which responds to such digital signals for developing an analog control signal that is utilized for adjusting the amount of delay in the delay circuit 23. A fast initial drive is provided for the counter 30 to achieve rapid phase pull-in. This drive is controlled primarily by eye-finder pulses in the output of the gate 32 which are coupled through a coincidence gate 39 to a predetermined intermediate stage of the counter.

The same eye-finder pulses are additionally coupled to the least significant stage of the counter by the gate 31 whenever such pulses are in time coincidence with an aperture pulse on the circuit 33. It will be subsequently shown that when coarse pull-in has been achieved, the eye-finder inhibit circuit 29 disables the gate 39 so that counter 30 is thereafter driven by only those eye-finder pulses which are in time coincidence with an aperture pulse, and this drive is at a lower rate than was the aforementioned initial period drive. The number of counter stages included between the least significant stage input and the stage at which the output of gate 39 is received must be adapted to the needs of the overall data transmission system as a compromise between pull-in speed and the hold-in time constant of the phase recovery circuits. Thus, if an excessive number of stages are included between these two input connections there would be a long time lag between an indicated need for phase adjustment and the actual accomplishment of such adjustment. However, at the other extreme, if no intermediate stages were provided, the eye-finder pulses alone and the eye-finder pulses in coincidence with aperture pulses would exercise a wide swinging control and thereby prolong phase pull-in time. For example, the use of four counter stages between the inputs from gate 31 and gate 39 would produce an advantageous compromise between pull-in speed and hold-in time constant for a data transmission system operating in a sixteen level mode with 2400 multilevel symbols per second.

The auxiliary phase recovery branch circuit 25 is utilized for determining when coarse phase pull-in has been completed. The circuits of the auxiliary adjusting branch are similar to those of the main branch in that the delay circuit 28 is controlled by signals from a digital-to-analog converter 38' which represent counting level conditions of a reversible binary counter 30'. The latter counter is driven by eye-finder pulses from the output of gate 21, and its direction of operation is controlled by a pulse wave which is a function of the output of the delay circuit 28.

A frequency dividing circuit 40 receives the output of the digital delay circuit 28 and advantageously divides the frequency of such output by two for application to control the direction of operation of the counter 30'. This direction control wave is essentially the same as the symbol clock wave in FIG. 4. The counter controlled thereby, however, has fewer stages than does the counter 30 because it includes only stages corresponding to those stages of counter 30 which respond to the output of gate 39. Thus the counter 30' is advantageously operated at substantially the same rate as the counter 30 is operated during the initial pull-in mode. The output from the divide-by-two circuit 40 is also coupled through a pulse generator 41, which is similar to the pulse generator 27, to another input of the eye-finder inhibit circuit 29. Thus, pulses in the output of the pulse generator 41 occur at the symbol rate of the data wave and are of short duration so that they appear in much the same form as the sampling pulses in either FIG. 5 or FIG. 8.

Inhibit circuit 29 is adapted to indicate the occurrence of successive pulses of the sampling pulse type from generator 41 in time coincidence with aperture pulses on circuit 33. When, for example, ten successive ones of such pulses from generator 41 have appeared in coincidence with aperture pulses, it is assumed by the system that coarse phase pull-in has been achieved, and gate 39 is disabled so that counter 30 may be driven only by eye-finder pulses at its input of least significance.

The inhibit circuit 29 includes a coincidence gate 42 which receives the two input signals from the generator 41 and from the circuit 33. When such signals are in time coincidence a monopulser 43 is actuated to produce a pulse of predetermined fixed amplitude and duration. The output to monopulser 43 is coupled through a lowpass filter 46 to the input of a slicer circuit 47. Filter 46 has an upper cutoff frequency somewhat below the symbol rate of the data system and integrates the monopulser output so that the output voltage from the filter increases rapidly upon the occurrence of a train of successive pulses from generator 41 in coincidence with aperture pulses. This amplitude change in the output of filter 46 actuates slicer 47 to disable the gate 39. However, if during system operation phase lock between the timing signals and the data signals should be lost for some reason, the aforementioned repetitive coincidences would not occur; and the change in output signal level from filter 46 then causes slicer 47 to enable gate 39 once more so that counter 30 is driven at its high rate to achieve fast pull-in once more for restoring the phase synchronization required for accurate decoding.

Thus, the symbol phase recovery circuits 16 include a main control branch path for adjusting the phase of timing signals utilized to produce sampling pulses, and they also include an auxiliary control branch and an inhibit circuit for indicating when a coarse phase pull-in condition has been achieved. These circuits initially cause fast phase pull-in and thereafter reduce the rate of timing signal phase adjustment to a fine control basis, so that the desired phase relationship may be held by a strong control with a minimum amount of phase jitter.

Although the present invention has been described in connection with a particular embodiment thereof, it is to be understood that additional embodiments and modifications which will be apparent to those skilled in the art are included within the spirit and scope of the invention.

What is claimed is:

1. In combination first and second circuits including first and second phase adjusting means, respectively, means supplying timing signals to said first and second circuits, means supplying a train of irregularly occurring pulses having over a predetermined time interval a long time distribution probability with an envelope having a predetermined amplitude characteristic, first and second controlling means each receiving an output of a different one of said first and second adjusting means and also receiving said irregularly occurring pulses, said controlling means being coupled to control said first and second phase adjusting means, respectively, to shift said timing signals toward a predetermined phase relationship with respect to said distribution characteristic, means responsive to an output of said first adjusting means generating recurring pulses with a period substantially the same as said interval but with a pulse width which is much smaller than said interval, and means responsive to coincidence of said recurring pulses and the timing signals from said output of said second adjusting means inhibiting the application of said irregularly recurring pulses to said first controlling means.

2. The combination in accordance with claim 1 in which said inhibiting means comprises a coincidence gate having input connections coupled to receive an output of said second adjusting means and said recurring pulses, frequency detection means producing an output signal amplitude change of predetermined character as the repetition rate of output pulses from said coincidence gate changes through a predetermined reference rate level, and means coupling said detection means to inhibit the application of said irregularly occurring pulses to said first control means whenever said repetition rate exceeds said reference level.

3. The combination in accordance with claim 1 in which each of said controlling means comprises a reversible counter driven by said irregularly occurring pulses, means responsive to the output of said adjusting means controlled by and corresponding to such controlling means reversing said counter approximately midway between each two successive ones of said recurring pulses, and means coupling the output of said counter to control said corresponding adjusting means.

4. The combination in accordance with claim 3 in which said counter output coupling means includes a digital-to-analog converter developing an analog control signal having a magnitude corresponding to the magnitude of a prevailing count level in said counter, and means applying said control signal to said adjusting means for controlling the phase of said timing signals in accordance with the count level in said counter.

5. The combination in accordance with claim 1 which comprises in addition a coincidence gate having an output thereof coupled to said first controlling means, and means coupling to said gate said recurring pulses and said irregularly occurring pulses for actuating said first controlling means in response to coincidence of such pulses.

6. The combination in accordance with claim 5 in which said inhibiting means comprises a coincidence gate having input connections coupled to receive an output of said second adjusting means and said recurring pulses, frequency detection means producing an output signal amplitude change of predetermined character as the repetition rate of output pulses from said coincidence gate changes through a predetermined reference rate level, and means coupling said detection means to inhibit the application of said irregularly occurring pulses to said first control means whenever said repetition rate exceeds said reference level.

7. The combination in accordance with claim 5 in which each of said controlling means comprises a reversible counter driven by said irregularly occurring pulses, means responsive to the output of said adjusting means controlled by such controlling means reversing said counter approximately midway between each two successive ones of said recurring pulses, and means coupling the output of said counter to control the last-mentioned adjusting means.

8. The combination in accordance with claim 7 in which said first and second control means receive said irregularly occurring pulses for driving said counters thereof at substantially the same rate.

9. The combination in accordance with claim 8 in which said means coupling said recurring and irregularly occurring pulses in coincidence actuate said counter of said first control means at a lower rate than the rate of operation thereof in response to said irregularly occurring pulses.

10. In combination, means receiving a multilevel coded data signal including a train of data symbols occurring at a predetermined rate, means generating a transition pulse each time said signal includes a signal excursion between adjacent ones of multiple information-determinant levels thereof, means receiving a train of timing signals, means responsive to said timing signals generating a train of regularly recurring pulses, the latter pulses occurring at said predetermined symbol rate of said data signal and having a pulse width which is substantially less than the period of said signal symbols,
means integrating said transition pulses, and
means adjusting the phase of said timing signals, said adjusting means including means initially operative in response to all of said transition pulses and thereafter operative in response to only those transition pulses which are in time coincidence with one of said recurring pulses.

References Cited

UNITED STATES PATENTS

| | | | |
|---|---|---|---|
| 3,206,681 | 9/1965 | Brown | 325—321 |
| 3,248,664 | 4/1966 | Krasnick et al. | 178—69.5 X |

ROBERT L. GRIFFIN, *Primary Examiner.*

J. T. STRATMAN, *Assistant Examiner.*